R. R. GIBSON.
COTTON CHOPPER.
APPLICATION FILED APR. 17, 1909.
952,007.
Patented Mar. 15, 1910.
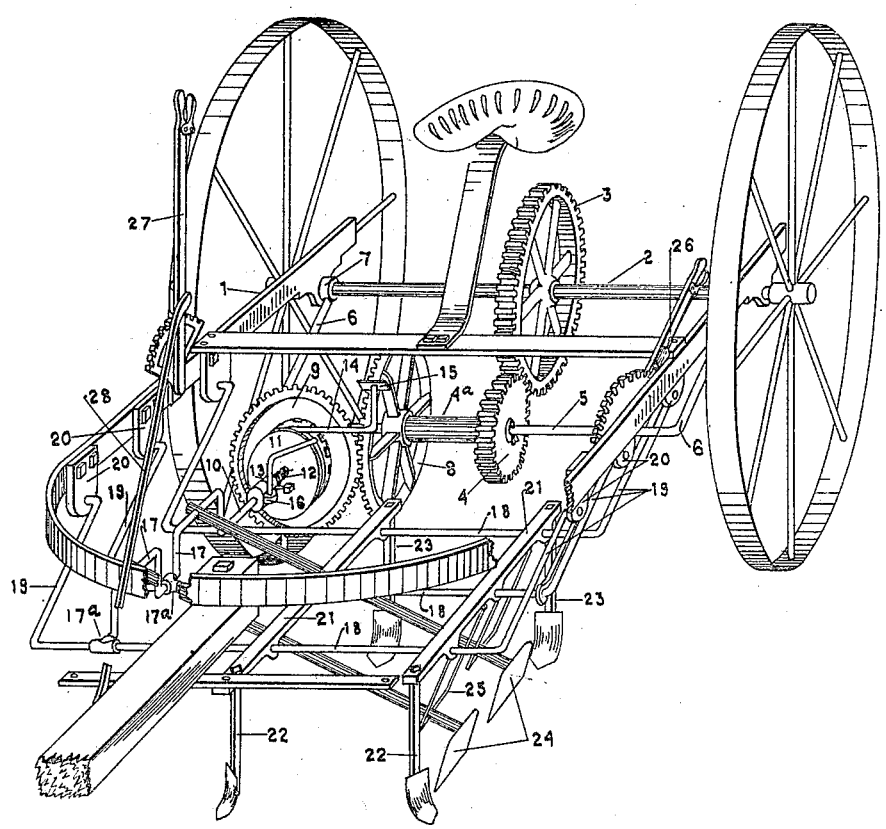
WITNESSES:
John S. Murray
Jessie Kirk
INVENTOR
R. R. Gibson
BY John M. Spellman
ATTORNEY

UNITED STATES PATENT OFFICE.

RUPERT R. GIBSON, OF WACO, TEXAS.

COTTON-CHOPPER.

952,007.

Specification of Letters Patent. Patented Mar. 15, 1910.

Application filed April 17, 1909. Serial No. 490,560.

*To all whom it may concern:*

Be it known that I, RUPERT R. GIBSON, a citizen of the United States, residing at Waco, in the county of McLennan and State of Texas, have invented certain new and useful Improvements in Cotton-Choppers, of which the following is a specification.

My invention relates to new and useful improvements in cotton-choppers. Its object is to provide a cotton-chopper carrying hoes or choppers mechanically operated from the axle of the machine, whereby rows of cotton may be expeditiously and efficiently hoed or chopped, clearing the same from weeds or other obstruction detrimental to the growth of the cotton.

Another object is to provide a cotton-chopper, carrying mechanically operated hoes, to which power is transmitted from the axle of the machine, the stroke of which hoes will be such as to cause their blades to transcribe an approximate ellipse, thus covering a greater transverse area and giving greater efficiency than the circular stroke of present cotton choppers.

Finally my object is to provide a device of the character described, which will be strong, durable, simple and efficient, and comparatively easy to construct, and also one in which the various parts will not be likely to get out of working order.

With these and various other objects in view, my invention has relation to certain novel features of construction and operation, an example of which is described in the following specification and illustrated in the accompanying drawing, which is a perspective view of the cotton chopper.

In the drawing, numeral 1 designates the frame of the machine, and 2 the axle thereof which is upheld by transporting wheels fast upon its extremities. A gear 3 is mounted upon said axle to rotate therewith, and is in mesh with a pinion 4, mounted upon one end of a sleeve 4ᵃ, which sleeve is rotatably mounted upon a swinging shaft 5. The shaft 5 is provided with two right angle turns at each side, forming arms 6 at the extremities of which are collars 7 mounted upon the axle 2. Upon the other extremity of the sleeve 4ᵃ, a beveled gear 8 is mounted to rotate with said sleeve. The beveled gear 8 meshes with a second beveled gear 9, mounted upon a shaft 10 and loose upon said shaft. The gear 9 carries radial clutch teeth, in which engages a clutch 11, mounted upon shaft 10 and held in engagement by a spiral spring 12 upon said shaft. A set collar 13 is stationary upon said shaft, restricting said spring from expansion in a direction opposite to the clutch. A foot lever 14 encircles said clutch 11 in a suitable groove and is provided at one extremity with a foot rest 15, and at the other extremity is rigidly attached to a collar 16, slidably mounted upon shaft 10, and restricted from rotating thereupon. Collar 16 thus serves to restrict the foot lever from transverse displacement, at the same time permitting said foot lever sufficient freedom of longitudinal motion to allow said lever to engage or release said clutch 11, as desired.

The applicant does not care to restrict himself to the form of clutch here shown and described, as clutches of other construction may be applied to accomplish the same purpose.

The shaft 10 is provided with two cranks 17, between which cranks, and at each extremity thereof, are bearings 17ᵃ, in which shaft 10 is rotatably mounted. The bearings 17ᵃ are provided also with transverse apertures, in which are pivotally mounted three swinging arms 18, having right-angled turns at each side, forming upright arms 19, which are rotatably mounted in bearings 20, attached to the frame 1. Two longitudinal beams 21 are mounted upon the transverse arms 18, being provided with bearings, in which the arms 18 are free to turn. At the forward extremities of said beams 21, plows 22 are mounted, each of which have a quarter-turn out, and which serve to remove a portion of the dirt from the row of cotton, producing a more level surface for the hoes to act upon, and limiting the depth to which the hoes enter the ground. At the rear extremity of the beams 21, a second pair of plows 23 are carried, which are transverse with the machine, which act as levelers, and which replace on the row of cotton a portion of the soil removed by the forward plows. This arrangement of the swinging, transverse hangers 18 and the longitudinal beams 21 forms a swinging frame, in which are mounted the hoes 24. The handles of said hoes are mounted at their upper extremity in the aforesaid cranks 17, whereby said hoes are operated. At their lower extremity, the hoes are supported by swinging links 25, said links being pivotally attached to the hoes and swinging freely from the outer of the two beams 21. A lever 26 is attached to the middle hanger 18, and is rigidly attached to the arm 19 of said hanger. The journal of said arm 19 in its bearing 20 serves as a fulcrum for lever 26. This lever is provided with the usual form of curved rack, and spring actuated rod engaging in the teeth of said rack, whereby the lever is adjusted in any desired position. When this lever is in a vertical position, the swinging frame which carries the hoes is in its lowest adjustment, while by pushing the lever forward or backward, the hoes may be made to clear the ground. Thus the operator is enabled to hit or miss any stalk of cotton or other obstacle as he desires. By means of a lever 27, connected by a rod 28 to the tongue of the machine, said tongue may be swung at an angle to the plow, and may be held in adjustment by the usual curved rack, and spring actuated rod engaging with the teeth thereof, attached to lever 27. It is to be noted that the shaft 10 is pivotally attached to the hanger 5, which swings from the axle of the machine, thus including said hanger 5 in the swinging frame formed by the hangers 18, and the longitudinal beams 21 mounted thereon. When said swinging frame is raised or lowered by means of lever 26, the pinion 4 travels around the periphery of the gear 3, remaining in mesh with said gear in every position.

Especial attention is called to the stroke of the hoes in the device described, which when the swinging links 25 are of proper length, will have the shape of an ellipse flattened on its under side, thus keeping the hoe blades in contact with the soil across the entire width of the row.

It is of course understood that the field of application of this device is not limited to the chopping of cotton only, as it can also be made useful in the cultivation of corn and various other plants.

I am aware that changes may be made in the form and construction of parts and details of the device herein described as the preferable embodiment of my invention, without departing from the spirit or sacrificing the advantages thereof, and I therefore reserve the right to make such changes and alterations in said device, as fairly come within the scope thereof.

What I claim, is:

1. In a cotton-chopper, the combination with a main frame, an axle supporting the same, and transporting-wheels supporting the axle and rotating the cam, of a supplemental frame swinging longitudinally of the machine, supported from the axle and the main frame, a longitudinally-disposed crank-shaft, rotatably mounted in said supplemental frame and forming a part thereof, a mechanism transmitting rotation to said crank-shaft from the transporting wheels of the machine, a clutch whereby the transmission of such rotation may be interrupted, a hoe mounted in said swinging frame, the upper extremity of whose handle is mounted in the crank of said crank-shaft and rotated thereby, rigid, swinging links, whereby the lower extremity of said hoe-handle is suspended from said supplemental frame and a lever mechanism whereby said frame may be raised or lowered, and held in adjustment.

2. In a cotton-chopper, the combination with a main frame, an axle supporting the same, and transporting-wheels supporting the axle and rotating the same, of a supplemental, swinging frame supported from said axle and from the main frame, swinging longitudinally with the machine, a horizontal swinging bar, forming a part of said supplemental frame and supported from said axle, a spur-gear fast upon said axle, a spur-gear loose upon said horizontal bar and meshing with said spur-gear upon said axle, a rotatable crank-shaft longitudinally mounted in said swinging frame and forming a part thereof, mechanism transmitting the rotation of said gear upon said horizontal bar to said crank-shaft, a chopping-hoe having its handle mounted in the crank of said crank shaft, and a swinging support for the lower portion of said hoe-handle.

3. In a cotton-chopper, the combination with a main frame, an axle supporting the same, and transporting-wheels supporting the axle and rotating the same, of a supplemental swinging frame supported from said axle and the main frame, swinging longitudinally of the machine, a horizontal swinging-bar, forming a part of said supplemental frame, and supported from the axle, a spur-gear fast upon said axle, a spur-gear loose upon said horizontal bar and restricted from transverse motion thereupon, a beveled gear loose upon said horizontal bar and rigidly attached to said spur-gear thereon, a rotatable crank-shaft, longitudinally-disposed in said swinging frame and a part thereof, a beveled gear loose upon said crank-shaft and meshing with said beveled gear upon said horizontal bar, a clutch upon said crank shaft whereby said shaft may be made to rotate with the beveled gear thereupon, a hoe transversely mounted in said swinging frame, the upper extremity of its handle being pivotally mounted in the crank of said crank-shaft, and a swinging support for the lower extremity of said hoe-handle.

4. In a cotton-chopper, the combination with a main frame, of an axle upon which said frame is mounted, and transporting-wheels supporting the axle and rotating the same, of a supplemental swinging frame, suspended from the main frame and the axle, swinging longitudinally with the machine, lever mechanism whereby said swinging frame may be adjusted at various heights, a horizontal swinging bar provided at each side with arms at right angles thereto, which are pivotally supported from the axle, a spur-gear fast upon said axle, a spur-gear or pinion loose upon said horizontal bar and restricted from transverse motion thereupon, a rotatable crank-shaft longitudinally-disposed in said frame and forming a part thereof, a beveled gear loose upon said horizontal bar, and rigidly attached to said spur-gear thereupon, a beveled gear or pinion loose upon said crank-shaft, and restricted from transverse motion thereon, clutch teeth being provided on the back face thereof, a clutch slidably mounted on said crank-shaft engaging said clutch teeth on the back face of said beveled gear, a hoe transversely mounted in said swinging frame, the upper extremity of its handle being pivotally mounted in the crank of said crank-shaft, and a swinging support connecting the lower extremity of said hoe-handle to said supplemental frame.

5. In a cotton-chopper, the combination with a frame, an axle upon which said frame is mounted, and supporting-wheels, supporting the axle and rotating the same, of a spur-gear mounted upon said axle, a transverse, horizontal swinging-bar, supported freely from said axle by arms at each side, a spur-gear or pinion mounted loose upon said horizontal bar, restricted from transverse motion thereon, and meshing with said gear upon the axle, a beveled gear rigidly attached to or integral with said spur-gear upon said horizontal bar, transverse horizontal bars swung from frame of machine by arms at each side, a rotatable counter-shaft longitudinally-disposed upon said transverse bar swung from axle and said transverse bars swung from frame, and forming with said transverse bars a supplemental swinging frame, constantly horizontal, a beveled gear or pinion loose upon said crank-shaft, the back surface of which is provided with radial clutch teeth, a spring-actuated clutch, slidable upon said crank-shaft and engaging said clutch teeth upon said beveled gear, a lever mechanism whereby said clutch is made to release said beveled gear, permitting the rotation of said crank-shaft to be interrupted, longitudinal rods mounted upon said transverse bars, hoes operating in said supplemental frame, the handles of which are mounted in the cranks of said crank-shaft, swinging links whereby the lower extremities of said hoe-handles are supported from said longitudinal rods of the frame, and a lever rigidly attached to one of the upright side arms of one of the transverse, swinging rods of the supplemental frame, the fulcrum for said lever being furnished by the journal of said side arm in the main frame, said lever serving to raise or lower said swinging frame and hold the same in adjustment.

In testimony whereof I have signed my name to this specification in the presence of two subscribing witnesses.

RUPERT R. GIBSON.

Witnesses:
LAURA DISMUKES,
B. F. NEWBERY.